(12) United States Patent
Hirano et al.

(10) Patent No.: US 9,914,584 B2
(45) Date of Patent: Mar. 13, 2018

(54) THREE-PIECE RESEALABLE CAN

(71) Applicant: Nippon Steel & Sumitomo Metal Corporation, Tokyo (JP)

(72) Inventors: Shigeru Hirano, Tokyo (JP); Yoshiaki Tani, Tokyo (JP); Hirokazu Yokoya, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 725 days.

(21) Appl. No.: 14/235,853

(22) PCT Filed: May 27, 2013

(86) PCT No.: PCT/JP2013/064622
§ 371 (c)(1),
(2) Date: Jan. 29, 2014

(87) PCT Pub. No.: WO2013/180056
PCT Pub. Date: Dec. 5, 2013

(65) Prior Publication Data
US 2014/0183086 A1    Jul. 3, 2014

(30) Foreign Application Priority Data

May 31, 2012   (JP) ................. 2012-124812

(51) Int. Cl.
*B65D 85/84* (2006.01)
*C25D 5/12* (2006.01)
(Continued)

(52) U.S. Cl.
CPC .............. *B65D 85/84* (2013.01); *B32B 15/09* (2013.01); *B32B 15/18* (2013.01); *C25D 5/10* (2013.01);
(Continued)

(58) Field of Classification Search
CPC ..... B32B 15/09; B32B 15/18; B32B 2439/66; B32B 2255/205; B32B 2255/28;
(Continued)

(56) References Cited

U.S. PATENT DOCUMENTS 9,061,787 B2 * 6/2015 Hirano
2013/0089751 A1 * 4/2013 Hirano ................. C25D 3/54
428/648
2013/0146594 A1 * 6/2013 Hirano ................. C23C 28/00
220/62.17

FOREIGN PATENT DOCUMENTS

CA   2483666    11/2003
JP   03-049628  7/1991
(Continued)

OTHER PUBLICATIONS

Office Action dated Oct. 28, 2014 issued in Canadian Application No. 2842910.
(Continued)

*Primary Examiner* — Yan Lan
(74) *Attorney, Agent, or Firm* — Birch, Stewart, Kolasch & Birch, LLP

(57) ABSTRACT

A three-piece resealable can for acidic liquid includes, a cylindrical can body member that includes a screw portion at one end; and a can bottom member that contacts the can body member so as to close an opening portion of the other end of the can body member. The can body member includes a cylindrical first steel sheet, Ni plating that is formed on an inner circumferential surface of the first steel sheet, a polyester film that is formed so as to be disposed on the outermost surface of the inner circumference of the can body member, and a Zr-containing film that is formed between the first steel sheet and the polyester film. The can bottom member includes a second steel sheet, and Sn plating that is (Continued)

formed on the can body member side of the can bottom member. The Zr-containing film contains Zr compounds.

9 Claims, 8 Drawing Sheets

(51) Int. Cl.
  C25D 5/10    (2006.01)
  C25D 5/48    (2006.01)
  C25D 9/10    (2006.01)
  B32B 15/09   (2006.01)
  B32B 15/18   (2006.01)
  C25D 7/06    (2006.01)
  C25D 3/12    (2006.01)
  C25D 3/30    (2006.01)
  C25D 5/50    (2006.01)

(52) U.S. Cl.
  CPC ............... C25D 5/12 (2013.01); C25D 5/48 (2013.01); C25D 7/0614 (2013.01); C25D 9/10 (2013.01); B32B 2255/06 (2013.01); B32B 2255/205 (2013.01); B32B 2255/28 (2013.01); B32B 2307/206 (2013.01); B32B 2307/714 (2013.01); B32B 2439/66 (2013.01); C25D 3/12 (2013.01); C25D 3/30 (2013.01); C25D 5/505 (2013.01)

(58) Field of Classification Search
  CPC . B32B 2255/06; B32B 2307/714; C25D 3/12; C25D 3/30; C25D 5/10; C25D 5/12; C25D 5/48; C25D 5/505; C25D 7/0614; C25D 9/10; B65D 85/84
  See application file for complete search history.

(56) References Cited

FOREIGN PATENT DOCUMENTS

| | | |
|---|---|---|
| JP | 05-032256 | 2/1993 |
| JP | 06-135441 | 5/1994 |
| JP | 06-218462 | 8/1994 |
| JP | 07-002998 | 1/1995 |
| JP | 07-156953 | 6/1995 |
| JP | 2000-080499 | 3/2000 |
| JP | 2000-087298 | 3/2000 |
| JP | 2006-341851 | 12/2006 |
| JP | 3857866 | 12/2006 |
| JP | 4885334 | 2/2012 |
| JP | 4920800 | 4/2012 |
| WO | 2007/111354 | 10/2007 |
| WO | 2010/140711 | 12/2010 |
| WO | 2011/118848 | 9/2011 |
| WO | WO 2011/118588 | 9/2011 |
| WO | 2012/002360 | 1/2012 |
| WO | WO2012/002360 | * 1/2012 |
| WO | WO2012/042973 | * 4/2012 |

OTHER PUBLICATIONS

Office Action dated Jan. 28, 2014 issued in JP Application No. 2013-541107 [With English Translation].

International Search Report dated Aug. 13, 2013 issued in corresponding PCT Application No. PCT/JP2013/064622 [With English Translation].

* cited by examiner

THREE-PIECE RESEALABLE CAN

FIELD OF THE INVENTION

The present invention relates to a three-piece resealable can which can store acidic liquid, particularly an acidic beverage such as fruit juice, at high quality.

This application is a national stage application of International Application No. PCT/JP2013/064622, filed May 27, 2013, which claims priority to Japanese Patent Application No. 2012-124812, filed May 31, 2012, the contents of which are incorporated herein by reference.

DESCRIPTION OF RELATED ART

A three-piece resealable can is mostly configured of a can body member, a can bottom member, and a cap. The can body member is a steel sheet on which a PET film is laminated in advance except for portions to be welded. The steel sheet is rounded in a cylindrical shape, the portions to be welded overlap with each other only by 0.3 to 0.6 mm, electric resistance welding is performed on the portions, and therefore, a cylindrical can body is manufactured.

Flanging is performed on a lower portion of a can body and a bottom cover (a can bottom member) is provided on the lower portion. On the other hand, in order to provide the cap on an upper member of the can body, after necking, threading is performed so that resealability due to the cap is realized. The threading is a forming in which rotating dies are pressed to the inner surface and the outer surface of the can body and a shape of a thread and groove of the screw is formed in a circumferential direction of the can body. However, at this time, a large shearing force is generated in the circumferential direction at the place where the dies abut. Accordingly, it is necessary to secure adhesiveness so that the laminated film is not peeled from the body material (steel sheet) by the shearing force. In this way, the cap made of aluminum on which the threading is performed can be screw-capped around the place subjected to the threading. Moreover, a method is known in which a cap which does not have thread is covered on the can before the threading is performed, dies are pressed onto the cap, and the threading is performed on the can main body and the cap together (for example, refer to Patent Document 1).

In the body material of a general three-piece can, a steel sheet such as a tinplate in which a portion of Sn is alloyed by reflow (melting treatment of Sn) after Sn plating is preferably used (for example, refer to Patent Documents 2 to 7). However, a Ni-plated steel sheet without using Sn is also used (for example, refer to Patent Document 8 and 9). Since acidic beverages such as fruit juice have relatively high corrosiveness, an Sn-plated steel sheet in which unalloyed Sn performs a sacrificial protection with respect to an iron matrix tends to be used for the acidic beverages. On the other hand, a Ni-plated steel sheet is applied for beverages having relatively low corrosiveness. Moreover, since the Ni-plated steel sheet has significantly improved film adhesiveness, particularly, the adhesiveness in the formed portion compared to the Sn-plated steel sheet, the Ni-plated steel sheet is used for a member obtained by high deformation.

PRIOR ART DOCUMENT

Patent Document

[Patent Document 1] Japanese Unexamined Patent Application, First Publication No. 2006-341851

[Patent Document 2] Japanese Unexamined Patent Application, First Publication No. H6-135441

[Patent Document 3] Japanese Unexamined Patent Application, First Publication No. H6-218462

[Patent Document 4] Japanese Unexamined Patent Application, First Publication No. H7-156953

[Patent Document 5] Japanese Unexamined Patent Application, First Publication No. H5-32256

[Patent Document 6] Japanese Examined Patent Application, Second Publication No. H7-2998

[Patent Document 7] Japanese Examined Patent Application, Second Publication No. H3-49628

[Patent Document 8] Japanese Unexamined Patent Application. First Publication No. 2000-80499

[Patent Document 9] Japanese Unexamined Patent Application. First Publication No. 2000-87298

[Patent Document 10] Japanese Patent No. 4885334

SUMMARY OF THE INVENTION

Problems to be Solved by the Invention

When the acidic beverages are filled into the three-piece resealable can, from the viewpoint of corrosion resistance, the Sn-plated steel sheet is optimal for the body material. However, when the threading is performed on the can body, the layer of the unalloyed Sn is deformed by a large shearing force, adhesiveness between the Sn plating and the film is damaged, and film wrinkles or film peeling are easily generated. Moreover, the alloy Sn (alloyed Sn) has improved adhesiveness, but the corrosion resistance with respect to the acidic beverages is not sufficient. On the other hand, in the Ni-plated steel sheet, the problem of the above-described film peeling is not substantially generated. However, since the corrosion resistance with respect to the acidic beverages is not sufficient, the function as a can may be decreased. Accordingly, a laminated three-piece resealable can capable of filling the acidic beverages is required.

For the above-described problems, Patent Document 10 suggests an application of a chromated steel sheet to a can body member. On the other hand, in view of reducing environmental load substances, a new technology for solving the above-described problems without using chromated steel sheets is needed in recent years.

Moreover, since a film which is obtained by a chromate treatment (chromate film) is a passive film, a pitting is likely to occur. Therefore, applying chromate treatment to Sn-plated steel sheets not only inhibits homogeneous dissolution of Sn by the passive film, but also may facilitate the pitting. Thus, a laminated three-piece resealable can which stably exhibits corrosion resistance for the acidic beverages is needed.

An object of the present invention is to provide a three-piece resealable can having further improved corrosion resistance for the acidic storage substance so as to solve the above-described problems.

Methods for Solving the Problems

The inventors found that progress of the corrosion could be suppressed even though acidic beverages were filled into a can by using an Sn-plated steel sheet (for example, no coating and no film) on a bottom cover of a laminated three-piece resealable can for securing corrosion resistance, and by using a Ni-plated steel sheet for securing film adhesiveness during forming. Moreover, when at least a portion of the Ni-plated steel sheet which is used in the body material of the can further includes alloyed Sn plating, Sn in the Sn plating has an effect of further suppressing the corrosion.

The corrosion in the can rapidly progresses due to oxygen which is mixed in at the time of filling of the beverage and gradually proceeds after the oxygen is consumed. Then, the inventors found the following. In an initial stage of the corrosion, the oxygen in the can was consumed by the sacrificial protection of Sn. After the oxygen was consumed, since the corrosion rate was significantly decreased even in the Ni-plated steel sheet which was often applied to a low-corrosive beverage, in practical use, a sufficient life span could be secured.

Furthermore, the present inventors have found that since an application of steel sheet having a Zr-containing film to can body member enables to maintain sufficient conduction between the can body member and the can bottom member, corrosion resistance for acidic beverages which have higher corrosiveness (for example, salt-containing tomato juice) is further improved without using environmental load substances. In addition, the present inventors have found that sufficient corrosion resistance is obtained even by forming a Zr-containing film on a Sn-plated steel sheet without inhibiting homogeneous dissolution of Sn.

The present invention can provide a three-piece resealable can for acidic beverages according to following aspects.

(1) A three-piece resealable can for acidic liquid according to an aspect of the present invention includes: a cylindrical can body member that includes a screw portion at one end; and a can bottom member that contacts the can body member so as to close an opening portion of the other end of the can body member, wherein the can body member includes a cylindrical first steel sheet, Ni plating that is formed on an inner circumferential surface of the first steel sheet, a polyester film that is formed so as to be disposed on the outermost surface of an inner circumference of the can body member, and a Zr-containing film that is formed between the first steel sheet and the polyester film, wherein the amount of Ni plating is 10 to 1000 mg/m$^2$, the Zr-containing film contains Zr compounds, and the amount of the Zr-containing film is 2 to 40 mg/m$^2$ expressed in terms of Zr metal, wherein the can bottom member includes a second steel sheet, and Sn plating that is formed on the can body member side of the can bottom member, the Sn plating being on or above the second steel sheet, and wherein the Sn plating includes Sn single metal plating in the amount of 2 to 15 g/m$^2$.

(2) In the three-piece resealable can for acidic liquid according to (1), the outermost surface on the can body member side of the can bottom member may be the Sn plating.

(3) In the three-piece resealable can for acidic liquid according to (1), the can bottom member may further include a Zr-containing film which is formed on a surface of the Sn plating, the Zr-containing film contains Zr compounds, the amount of the Zr-containing film being 2 to 40 mg/m$^2$ expressed in terms of Zr metal, and the outermost surface of the can bottom member being the Zr-containing film.

(4) In the three-piece resealable can for acidic liquid according to any one of (1) to (3), the Sn plating of the can bottom member may include alloyed Sn plating in the amount of 0.2 to 1.5 g/m$^2$.

(5) In the three-piece resealable can for acidic liquid according to any one of (1) to (4), the can bottom member may further include Ni plating in the amount of 10 to 200 mg/m$^2$ which is formed on the surface on the can body member side of the second steel sheet.

(6) In the three-piece resealable can for acidic liquid according to any one of (3) to (5), the Zr-containing film of the can bottom member may include one or more compounds as the Zr compounds which are selected from Zr oxide, Zr phosphate, Zr hydroxide, and Zr fluoride.

(7) In the three-piece resealable can for acidic liquid according to any one of (1) to (6), the amount of the Ni plating of the can body member may be 200 to 1000 mg/m$^2$.

(8) In the three-piece resealable can for acidic liquid according to any one of (1) to (6), the can body member may further include a Sn plating which is formed on the surface of the Ni plating, the Sn plating includes Sn single metal plating in 0.2 to 2 g/m$^2$ and alloyed Sn plating, the amount of the Ni plating being 10 to 200 mg/m$^2$, and the amount of the Zr-containing film being 2 to 40 mg/m$^2$ expressed in terms of Zr metal.

(9) In the three-piece resealable can for acidic liquid according to (8), the Sn plating of the can body member may further include an alloyed Sn plating in the amount of 0.2 to 1.5 g/m$^2$.

(10) In the three-piece resealable can for acidic liquid according to any one of (1) to (9), the Zr-containing film of the can body member may include one or more compounds as the Zr compounds which are selected from among Zr oxide, Zr phosphate, Zr hydroxide, and Zr fluoride.

Effects of the Invention

According to the present invention, the three-piece resealable can which has further improved corrosion resistance for acidic storage substances by suppressing local corrosion and improving the effect of the sacrificial protection can be provided. As a result, it is possible to store various acidic beverages at high quality.

DETAILED DESCRIPTION OF THE INVENTION

Figure 1A:
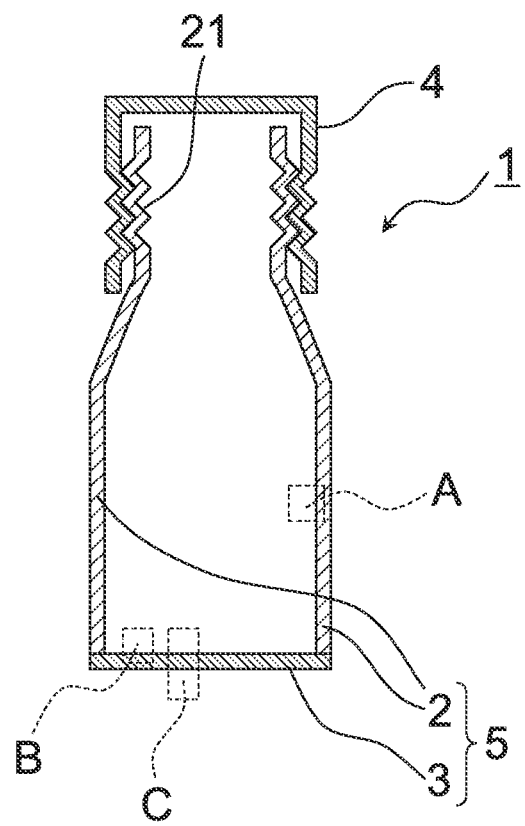
FIG. 1A is a schematic longitudinal cross-sectional view of a resealable can according to an embodiment of the present invention.

Hereinafter, preferable embodiments of the present invention will be described in detail.

According to this embodiment, the three-piece resealable can is provided with a can bottom member and a can body member to which threading is fabricated.

The can bottom member is formed using a Sn-plated steel sheet. In addition, a Zr-containing film may further be formed on the Sn plating layer of the Sn-plated steel sheet used for the can bottom member.

The can body member is formed using a Ni-plated steel sheet which has a Zr-containing film on the Ni plating and a polyester film such as PET film laminated on the Zr-containing film. Instead of using the above-described Ni-plated steel sheet, the can body member may be formed by a Sn-plated steel sheet which has an alloyed Sn layer formed by reflow on the Ni plating layer, a Zr-containing film on the alloyed Sn layer, and a laminated polyester film such as PET film laminated on the Zr-containing film.

Hereinafter, various types of steel sheets which are used for the can bottom member and the can body member will be described in detail.

[Plating Treatment and Film Formation]
[Sheet to be Plated]

A method of manufacturing a sheet (steel sheet) to be plated which is used for the three-piece resealable can of the present embodiment, the material of the sheet, or the like is not particularly limited. That is, a general slab (slab subjected to general refining and casting) is subjected to processes such as hot rolling, pickling, cold rolling, annealing, and skin pass rolling, and the sheet to be plated is manufactured.

[Ni Plating]

When Ni plating is performed on a sheet to be plated, generally, degreasing and pickling are performed as a pretreatment for cleaning the surface of the sheet to be plated. However, the possible methods are not particularly limited. For example, after the sheet to be plated is degreased in 10% sodium hydroxide, electrolytic pickling with respect to the sheet may be performed in 5% sulfuric acid solution. Sequentially after the degreasing and the pickling, the Ni plating is electrically performed on the sheet to be plated. The method of the Ni plating is also not particularly limited. For example, Ni plating may be performed using a known Watt bath. In addition, Ni—Fe plating may be formed as Ni plating. In this case, Ni—Fe alloy plating can be formed using a bath in which Fe ions are added to the known Watt bath, for example.

[Formation of Zr-Containing Film]

The Zr-containing film contains Zr compounds such as Zr oxide, Zr phosphate, Zr hydroxide, Zr fluoride and the like, and adheres tightly to the film by hydrogen bond.

For the formation of the Zr-containing film, for example, a method which immerses a steel sheet which is metal plated and a method which performs a cathode electrolysis to a steel sheet which is metal plated may be adopted using acidic solutions which mainly comprise, for example Zr fluoride, Zr phosphate, and hydrofluoric acid.

[Sn Plating]

Also when Sn plating is performed, similarly to the Ni plating, degreasing and pickling are performed as a pretreatment for cleaning the surface of the sheet to be plated. However, the method is not particularly limited. For example, after the sheet to be plated is degreased in 10% sodium hydroxide, electrolytic pickling with respect to the sheet may be performed in 5% sulfuric acid solution. Sequentially after the degreasing and the pickling, the Sn plating is electrically performed on the sheet to be plated. The method of the Sn plating is also not particularly limited. For example, the Sn plating may be performed using a known Ferrostan bath.

[Can Bottom Member]

The three-piece resealable can of this embodiment uses a Sn-plated steel sheet as the can bottom member. The object of using the Sn-plated steel sheet as the can bottom member is to secure corrosion resistance. In a container into which acidic beverage (acidic liquid) is filled, Sn provides a sacrificial protection with respect to the iron matrix. Particularly, just after the filling, that is, in the initial stage of corrosion, oxygen in the can which promotes the corrosion and Sn react with each other, and corrosion resistance is secured. The improvement of the corrosion resistance due to Sn begins to be exerted when the amount of Sn single metal plating in the Sn plating is 2 g/m$^2$ or more, and the corrosion resistance gently increases according to an increase in the amount of Sn plating. However, if the amount of Sn single metal plating exceeds 15 g/m$^2$, the improved corrosion resistance approaches a limit, which is economically disadvantageous. Accordingly, the amount of Sn single metal plating is limited to 2 to 15 g/m$^2$. In addition, it is preferable that the amount of Sn single metal plating be 3 g/m$^2$ or more.

The Sn single metal plating is defined as Sn plating to which alloying is not applied after the Sn plating, and the amount of Sn single metal plating is estimated as the amount independent from the amount of alloyed Sn plating described below. In addition, Sn single metal plating and alloyed Sn plating may include other elements derived from a plating bath.

In a Sn-plating layer (Sn plating) just after the plating is performed, invisible micro pinholes are present and the iron matrix may be exposed. Thus, the pinholes are removed by performing reflow (reflow of Sn) after the Sn plating, and the corrosion resistance can be improved. In addition, in this case, since an alloyed Sn layer (alloyed Sn plating) having improved corrosion resistance compared to pure Sn is formed, Sn (Sn in the Sn single metal plating) is dissolved by a sacrificial protection effect, corrosion of the place in which the Sn-plating layer is thinned is prevented, and dissolution of iron (iron matrix) can be suppressed. The improvement of the corrosion resistance due to the alloyed Sn layer begins to be exerted when the amount of alloyed Sn plating is 0.2 g/m$^2$ or more expressed in terms of Sn metal, and the corrosion resistance gently increases according to an increase in the amount of alloyed Sn plating. However, if the amount of alloyed Sn plating exceeds 1.5 g/m$^2$ expressed in terms of Sn metal, the improved corrosion resistance approaches a limit, which is economically disadvantageous. Accordingly, it is preferable that the amount of alloyed Sn plating be 0.2 to 1.5 g/m$^2$ expressed in terms of Sn metal. The method of reflow is not particularly limited, and an apparatus which can heat up to a temperature which exceeds a melting point of Sn may be used. For example, the reflow may be performed by electrical heating, induction heating, or heating in an electrical furnace. Moreover, the amount of alloyed Sn plating is estimated as an amount independent from the amount of Sn single metal plating.

In addition, in the Sn-plated steel sheet which is used for the can bottom member, the Ni plating may be performed before the Sn plating is performed. In this case, the Sn plating is formed on the Ni plating, and the appearance of the alloyed Sn plating can be silver-white. Generally, since Sn alloy forms a coarse surface of columnar crystals, the appearance is gray or black. However, if the alloyed Sn plating is formed on the Ni plating, since crystals of the Sn alloy become fine and are more densely precipitated, the appearance becomes silver-white. The improvement of the appearance due to Ni begins to be exerted when the amount of Ni plating is 10 mg/m$^2$ or more and gently increases according to an increase in the amount of Ni plating. However, if the amount of Ni plating exceeds 200 mg/m$^2$, the improved appearance approaches a limit, which is economically disadvantageous. Accordingly, when the Ni plating is performed on the can bottom member, it is preferable that the amount of Ni plating be 10 to 200 mg/m$^2$. The method of the Ni plating is not particularly limited. For example, the above-described method of the Ni plating may be used, and Ni—Fe alloy plating may be formed as the Ni plating, as described above.

Sequentially after the Sn plating, a Zr-containing film may be formed in order to secure the adhesiveness between the can and coating or the like. It is preferable that a surface corresponding to the inner surface of the can of the Sn-plated steel sheet be used for the can bottom member without formation of a Zr-containing film. However, a simple coating is applied to a surface corresponding to the outer surface of the can of the Sn-plated steel sheet in order to secure corrosion resistance (rustproofness) and slidability. Accordingly, it is preferable that a Zr-containing film be formed on the surface corresponding to the outer surface of the can of the Sn-plated steel sheet so as to improve coating properties. That is, the Zr-containing film contains Zr compounds which are firmly adhered to a coating material by hydrogen bonds, such as Zr oxide, Zr phosphate, Zr hydroxide, Zr fluoride, and the like. The improved adhesiveness begins to be exerted when the amount of Zr-containing film is 2 mg/m$^2$ or more expressed in terms of Zr metal, and the adhesiveness gently increases according to an increase in the amount of Zr compounds. However, if the amount of Zr-containing film exceeds 40 mg/m$^2$ expressed in terms of Zr metal, the improved adhesiveness approaches a limit, which is economically disadvantageous. Therefore, it is preferable that the amount of Zr-containing film be 2 to 40 mg/m$^2$ expressed in terms of Zr metal. Moreover, if the amount of Zr-containing film is within this range, even when the Zr-containing film is formed on the surface corresponding to the inner surface of the can of the can bottom member, the improvement of corrosion resistance due to Sn (sacrificial protection effect) can be sufficiently maintained. Accordingly, the Zr-containing film may be formed on both surfaces of the Sn-plated steel sheet. In this case, the formation of the Zr-containing film can be simply performed. In addition, the method of formation of the Zr-containing film is not particularly limited. For example, the method described in [Formation of Zr-containing film] for the formation of the Zr-containing film can be adopted.

In addition, forming a passive film on a portion which is in contact with the liquid is effective in order to improve corrosion resistance of the material in acidic liquid. However, the present inventors have found a problem that, in liquid which contains chloride ions such as tomato juice, chloride ions locally destroy the passive film and a pitting proceeds. Moreover, the present inventors have found a problem that conductivity between the can body member and the can bottom member decreases and the effect of the sacrificial protection by the Sn plating decreases when the chromate film is formed on the steel sheet (the can bottom member and/or the can body member). In this case, the Sn plating of the can bottom member does not dissolve homogeneously, and therefore, the corrosion resistance of the resealable can decreases.

On the other hand, the Zr-containing film does not form a passive film unlike the chromate film (hydrated Cr oxide). Therefore, when the Zr-containing film is formed on the can bottom member, the effect derived from the passive film cannot be obtained. However, it is possible not only to gain the corrosion resistance due to Zr compounds but also to suppress the pitting due to chloride ions and the like. When the Zr-containing film is formed on the can bottom member, it is possible to secure sufficient conductivity between the can body member and the can bottom member and obtain the effect of the sacrificial protection at a defective portion of the can body member (a portion which is likely to become an origin of the corrosion) by dissolving Sn-plating homogeneously. It is thought that a crack is generated on the Zr-containing film due to strong impact by seaming (for example, impact caused by the flange distal portion of the can body member), and thus, a metal plating of the can body member and a metal plating of the can bottom member can contact electrically, since the Zr-containing film, as mentioned above, contains Zr compounds such as Zr oxide, Zr phosphate, Zr hydroxide, and Zr fluoride.

Thus, by using the can bottom member on which the Zr-containing film is formed, it is possible not only to reduce environmental load substance (for example, the amount of Cr in nonmetallic metal film being equal to or less than 0.2 mg/m$^2$ expressed in terms of Cr metal), but also to improve adhesiveness to a coating and to store various acidic liquids in the three-piece resealable can.

[Can Body Member]

In the three-piece resealable can according to the present embodiment, a Ni-plated steel sheet (Ni-plated steel sheet that does not contain Sn plating or Sn-plated steel sheet that contains Ni plating) is used as the can body member.

The steel sheet (Ni-plated steel sheet that does not contain Sn plating) on which a polyester film such as a PET film is laminated on the Zr-containing film, which is formed on the Ni plating, may be used as the can body member.

The object of performing Ni plating is to secure weldability, corrosion resistance, and adhesiveness after forming. Ni has characteristics in which a solid-state bonding is easily performed by forge welding, and therefore, improved weldability can be exerted by the Ni plating. The improvement of the weldability due to the solid-state bonding begins to be exerted when the amount of Ni plating is 200 mg/m$^2$ or more and gently increases according to an increase in the amount of Ni plating. However, if the amount of Ni plating exceeds 1000 mg/m$^2$, the improved weldability approaches a limit, which is economically disadvantageous. Accordingly, in the case of obtaining the improvement of the weldability due to the solid-state bonding, it is preferable that the amount of Ni plating be 200 to 1000 mg/m$^2$.

When the Zr-containing film is formed with a coating weight of equal to or more than 2 mg/m$^2$ expressed in terms of a Zr metal, the adhesiveness to a resin film and the corrosion resistance remarkably improve. On the other hand, when the Zr-containing film is formed with a coating weight of equal to or more than 40 mg/m$^2$ expressed in terms of a Zr metal, the weldability and the quality of appearance deteriorate. In particular, since the electric resistance of the Zr-containing film is very high due to its insulation property, it may cause the deterioration of the weldability. Therefore, when the Zr-containing film is formed with a coating weight of equal to or more than 40 mg/m$^2$ expressed in terms of a Zr metal, the weldability remarkably deteriorates. Accordingly, it is necessary that the coating weight of the Zr-containing film be equal to or more than 2 to 40 mg/m$^2$.

In the Sn-plated steel sheet (Sn-plated steel sheet that contains Ni plating) which is used for the can body member, the Ni plating is performed before the Sn plating. The method of the Ni plating is not particularly limited. For example, the above-described method of the Ni plating may be used, and Ni—Fe alloy plating may be formed as the Ni plating, as described above.

The object of performing the Ni plating before the Sn plating is to secure corrosion resistance and adhesiveness. Since the Ni is a metal having an excellent corrosion resistance, the corrosion resistance of the alloyed Sn layer (alloyed Sn plating) containing Ni formed by the reflow can be improved. Moreover, if the Ni plating is performed before the Sn plating. Sn which is melted by the reflow is easily repelled, the amount of exposed portions of alloyed Sn layer having improved film adhesiveness increases, and the amount of exposed portions of unalloyed Sn decreases. Therefore, the film adhesiveness at the formed portion can be secured. The effect of Ni begins to be exerted when the amount of Ni plating is 10 mg/m$^2$ or more and gently increases according to an increase in the amount of Ni plating. However, if the amount of Ni plating exceeds 200 mg/m$^2$, the film adhesiveness approaches a limit, which is economically disadvantageous. Therefore, it is preferable that the amount of Ni plating be 10 to 200 mg/m$^2$.

The role of Sn in the Sn-plated steel sheet which is used in the can body member is to secure weldability. Since Sn has an effect which decreases contact resistance, electric resistance welding can be easily performed with respect to the Sn-plated steel sheet. The improvement of weldability due to the presence of Sn begins to be exerted when the amount of a single metal plating in the Sn plating is 0.2 mg/m$^2$ or more and the weldability gently increases according to an increase in the amount of Sn single metal plating. Moreover, if the amount of Sn single metal plating is 2 g/m$^2$ or less, according to the above-described effect of the Ni plating, the amount of exposed portions of alloyed Sn plating after a reflow described below can be sufficiently secured, and the film adhesiveness can be improved. Accordingly, in the case of obtaining the effect of improving the weldability due to the decrease in the contact resistance, it is preferable that the amount of Sn single metal plating be 0.2 to 2 g/m$^2$. Moreover, the amount of Sn single metal plating is estimated as an amount independent from the amount of alloyed Sn plating described below.

In this case, in order to secure the adhesiveness, the above-described reflow is performed. In the reflow, if the amount of the formed alloyed Sn plating is 0.2 g/m$^2$ or more expressed in terms of Sn metal, the adhesiveness (film adhesiveness) begins to improve, and the adhesiveness gently increases according to an increase in the amount of alloyed Sn plating. However, if the amount of alloyed Sn plating increases excessively, it is difficult for a hard alloyed Sn layer to deform properly during processing such as threading, damage such as cracks is generated in the alloyed Sn layer, and the adhesiveness or the corrosion resistance may be significantly deteriorated. Accordingly, the amount of alloyed Sn plating is preferably 1 g/m$^2$ or less, which are expressed in terms of Sn metal. In this way, it is preferable that the amount of alloyed Sn plating be 0.2 to 1 g/m$^2$ expressed in terms of Sn metal. The amount of alloyed Sn plating can be controlled by adjusting a temperature or time during the reflow. The method of the reflow is not particularly limited. Industrially, the reflow may be performed by electrical heating, induction heating, or heating in an electrical furnace. Moreover, the amount of alloyed Sn plating is estimated as an amount independent from the amount of Sn single metal plating.

Sequentially after the Sn plating, the formation of the Zr-containing film is performed in order to secure improved film adhesiveness (adhesiveness after forming) during forming. The Zr-containing film contains Zr oxide, Zr phosphate, Zr hydroxide, Zr fluoride, and the like. The Zr-containing film firmly adheres to a film by hydrogen bonds. The remarkably improved adhesiveness to a resin film and corrosion resistance begins to be exerted when the amount of Zr-containing film is 2 mg/m$^2$ or more expressed in terms of Zr metal. On the other hand, when the amount of Zr-containing film exceeds 40 mg/m$^2$ in terms of Zr metal, the weldability and the appearance deteriorate. In particular, since Zr compound has an insulating property, the electric resistance of the Zr-containing film is extremely higher than that of the metal plating. Therefore, to secure sufficient weldability, the amount of the Zr-containing film needs to be 40 mg/m$^2$ or less expressed in terms of Zr metal. Accordingly, the amount of the Zr-containing film needs to be 2 to 40 mg/m$^2$ expressed in terms of Zr metal. For the formation of the Zr-containing film layer, for example, the method described in [Formation of Zr-containing film] may be used.

As well as the above-described Zr-containing film of the can bottom member, the environmental load substances can be reduced (for example, the amount of Cr in a nonmetal film is 0.2 mg/m$^2$ or less expressed in terms of Cr metal) by using the can body member on which the Zr-containing film is formed. It is also possible to improve the adhesiveness to a polyester film and store various acidic liquids in the three-piece resealable can.

In addition, the configuration of the three-piece resealable can (hereinafter, referred to as a "resealable can") for acidic liquid of the embodiment will be further described with reference to the accompanying drawings.

FIG. 1A is a schematic longitudinal cross-sectional view of the resealable can of the embodiment. As shown in FIG. 1A, the resealable can 1 of the embodiment includes a cylindrical can body member 2 which includes a screw portion (screw formed portion) 21 at one end, a can bottom member 3 which contacts with the can body member 2 so as to close an opening portion of the other end of the can body member 2, and a cap 4 which is screwed to the screw portion 21 of the can body member 2. The end of the can body member 2 and the end of the can bottom member 3 are seamed to each other, the lower portion of the resealable can 1 is sealed, and a can main body 5 is formed. Similarly, the cap 4 is screwed to the can body member 2, and therefore, the upper portion of the resealable can 1 is closed to be resealable.

Moreover, it is preferable that the shape of the resealable can 1 satisfy the above-described configuration. However, the shape of the resealable can is not limited to the shape of FIG. 1A. Generally, aluminum is used in the material of the cap 4. However, if effects of the embodiment are not damaged, any material (for example, the same material as that of the can body member 2) may be used.

Figure 1B:
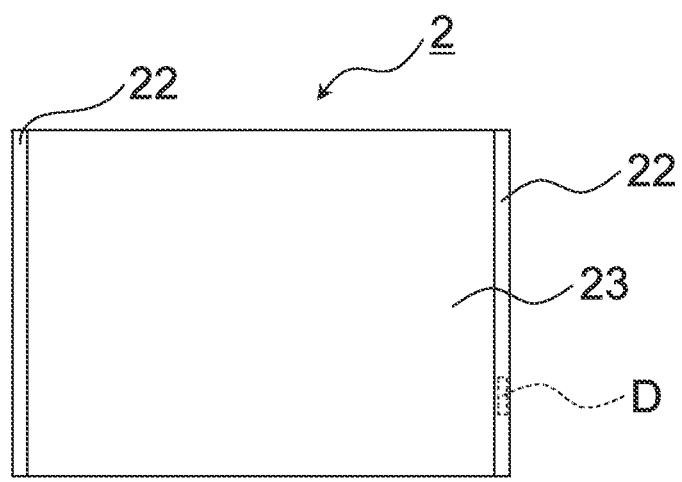
FIG. 1B is a schematic view of a can body member when viewed from the direction perpendicular to the sheet surface before the resealable can is manufactured.
Figure 1C:
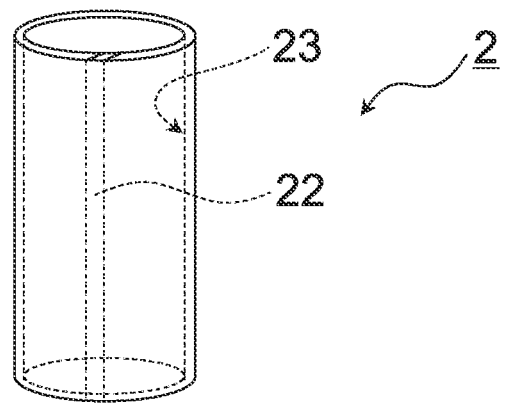
FIG. 1C is a schematic perspective view showing the can body member after a welding portion is welded.
Figure 1D:
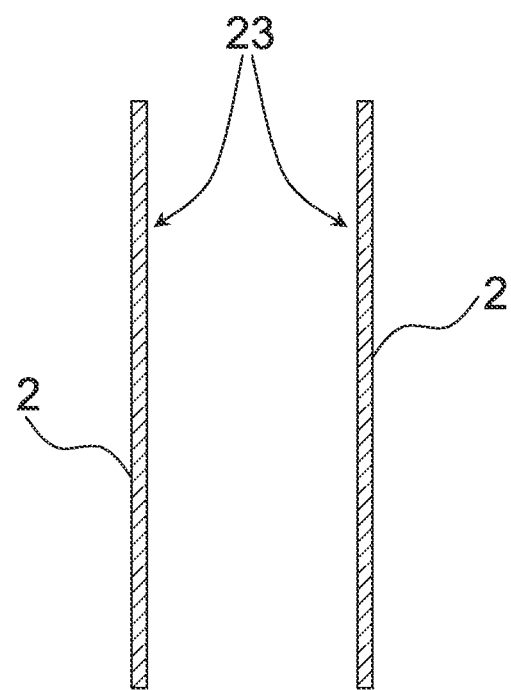
FIG. 1D is a schematic longitudinal cross-sectional view of the can body member shown in FIG. 1C.
Figure 1E:
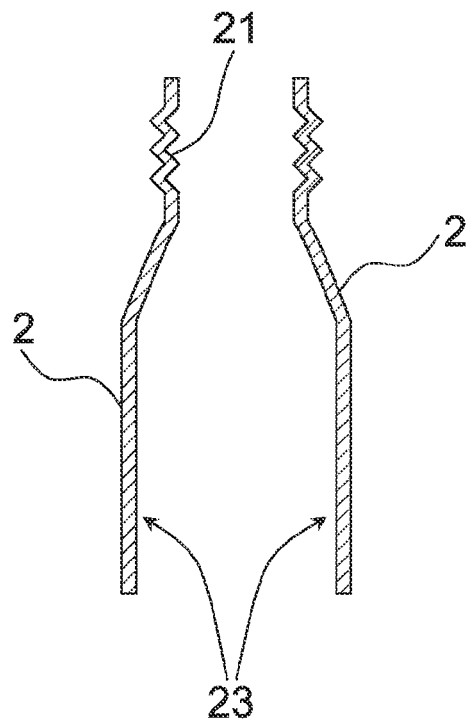
FIG. 1E is a schematic longitudinal cross-sectional view of the can body member after threading is performed.
Figure 1F:
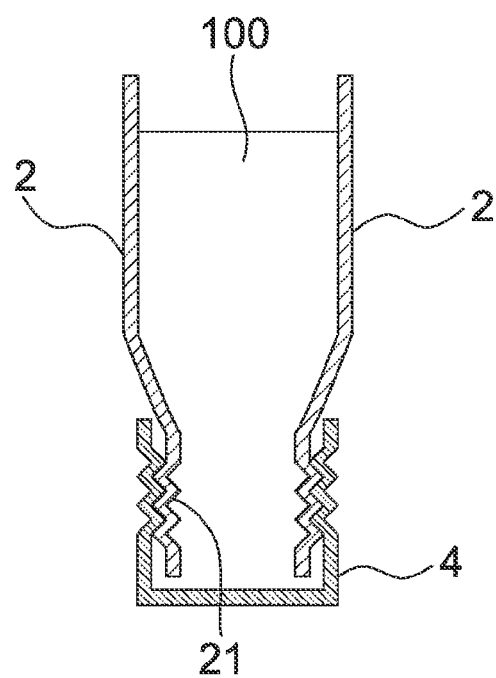
FIG. 1F is a schematic longitudinal cross-sectional view showing the can body member just after acidic liquid is filled.
Figure 1G:
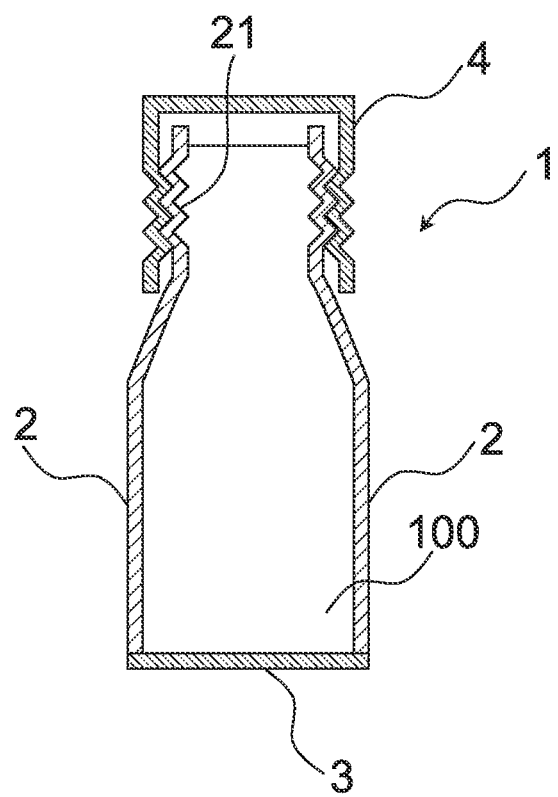
FIG. 1G is a schematic longitudinal cross-sectional view showing the resealable can into which the acidic liquid is filled.

Moreover, FIGS. 1B to 1G schematically show an example of a method of manufacturing the can main body of the embodiment. As shown in FIG. 1B, the can body member 2 before the resealable can 1 is manufactured is a sheet shape, and includes welding portions 22 and a polyester film 23 when viewed from a direction perpendicular to the sheet surface. The welding portions 22 are formed along two sides which face each other in the sheet surface of the can body member 2, and an organic film such as a polyester film 23 is not formed on the surfaces of the welding portions 22. The sheet-shaped can body member 2 is formed in a cylindrical shape. For example, the welding portions 22 overlap with each other and are welded by electric resistance welding (lap welding), as shown in FIGS. IC and ID (a longitudinal cross-sectional view of FIG. 1C), such that the cylindrical can body member 2 can be obtained. Moreover, the threading is performed on the cylindrical can body member 2, and the screw portion 21 shown in FIG. 1E is formed. The cap 4 is mounted on the screw portion 21, as shown in FIG. IF, and acidic liquid 100 (for example, acidic beverage) is filled from an opening portion of the end opposite to the end in which the screw portion 21 of the can body member 2 is formed. After the acidic liquid 100 is filled, as shown in FIG. 1G, the end (end of the opening portion side) of the can body member 2 and the end of the can bottom member 3 are seamed to each other so as to close the opening portion, and the resealable can 1 into which the acidic liquid 100 is filled is manufactured. Moreover, the acidic liquid 100 is not particularly limited, and may be an acidic beverage such as orange juice and tomato juice.

Figure 2A:
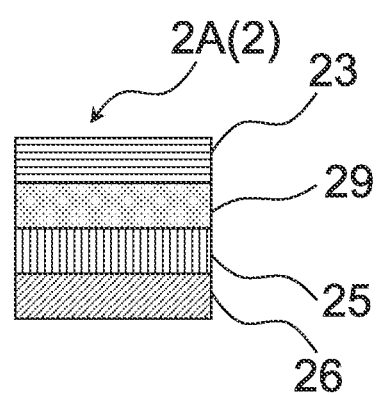
FIG. 2A is a cross-sectional view showing an example of a layer structure of the can body member of the resealable can according to the present embodiment.
Figure 2B:
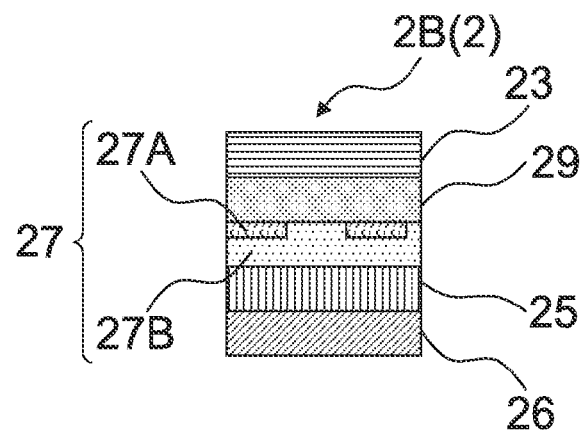
FIG. 2B is a cross-sectional view showing an example of the layer structure of the can body member of the resealable can according to the present embodiment.

In the resealable can 1 of the embodiment, for example, a plated steel sheet having a layer configuration shown in FIGS. 2A and 2B may be used for the can body member 2. FIGS. 2A and 2B schematically show an area A which is enclosed by a dashed line in FIG. 1A. Moreover, the layer configuration may be applied to at least the inner surface of the can main body 5 and may be also applied to both surfaces (inner surface and outer surface) of the can main body 5. As shown in FIGS. 2A and 2B, the can body member 2 includes a cylindrical steel sheet (a first steel sheet, a sheet to be plated) 26, Ni plating 25 which is formed on the inner circumference surface of the steel sheet 26, a polyester film 23 which is formed so as to be disposed on the outermost surface of the inner circumference of the can body member 2, and a Zr-containing film 29 which is formed between the polyester film 23 and the steel sheet 26 (or, Ni plating 25). As described above, the amount of Ni plating 25 of the can body member 2 is 10 to 1000 mg/m$^2$, and the amount of Zr-containing film 29 is 2 to 40 mg/m$^2$ expressed in terms of Zr metal. Moreover, in order to secure sufficient weldability, it is more preferable that the amount of metal plating which is the closest to the outermost surface of the inner circumference of the can body member (in FIGS. 2A and 2B, Ni plating 25 or Sn plating 27 (that is, the Sn single metal plating 27A and alloyed Sn plating 27B)) or the amount of sum of the metal plating be 200 to 3500 mg/m$^2$.

In FIG. 2A, an example of the above-described Ni-plated steel sheet for the can body member is shown. In FIG. 2A, the can body member 2A includes the steel sheet 26, the Ni plating 25 which is formed on the surface of the steel sheet 26, the Zr-containing film 29 which is formed on the surface of the Ni plating 25, and the polyester film 23 which is formed on the surface of the Zr-containing film 29.

Similarly, FIG. 2B shows an example of the above-described Sn-plated steel for the can bottom member. In FIG. 2B, the Sn plating 27 which is formed on the surface of the Ni plating 25 is further provided. In FIG. 2B, the can body member 2B includes the steel sheet 26, the Ni plating 25 which is formed on the surface of the steel sheet 26, the Sn plating 27 which is formed on the surface of the Ni plating 25, the Zr-containing film 29 which is formed on the surface of the Sn plating 27, and the polyester film 23 which is formed on the surface of the Zr-containing film 29. In FIG. 2B, the Sn plating 27 is alloyed and includes the Sn single metal plating 27A and the alloyed Sn plating 27B.

Figure 5:
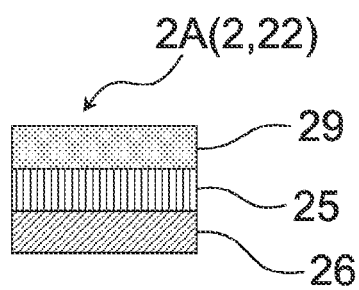
FIG. 5 is a cross-sectional view showing an example of a layer structure in the welding portion of the can body member of the resealable can according to the present embodiment.

Moreover, the polyester film 23 is not formed on the welding portion 22 of the can body member 2. Therefore, if the layer configuration of the non-welding portion of the can body member 2 is the layer configuration shown in FIG. 2A, the layer configuration of the welding portion 22 is the layer configuration shown in FIG. 5. Moreover, FIG. 5 schematically shows a longitudinal cross section of the welding portion 22 (area D) corresponding to the area A which is enclosed by the dashed line in FIG. 1A.

In the resealable can 1 of the embodiment, for example, a plated steel sheet having a layer configuration shown in FIGS. 3A to 3H can be used for the can bottom member 3. FIGS. 3A to 3H schematically show an area B which is enclosed by a dashed line in FIG. 1A. Moreover, this layer configuration may be applied to at least the inner surface of the can main body 5 and may be also applied to both surfaces (inner surface and outer surface) of the can main body 5. As shown in FIGS. 3A to 3H, the can bottom member 3 includes a steel sheet (second steel sheet, sheet to be plated) 36 and Sn plating 37 which is formed on the can body member 2 side of the steel sheet 36 (inner surface side of can main body 5). As described above, the Sn plating 27 of the can bottom member 3 includes Sn single metal plating of the amount of 2 to 15 g/m$^2$.

Figure 3A:
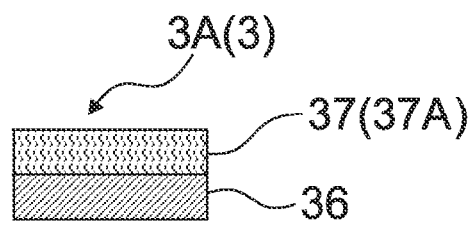
FIG. 3A is a cross-sectional view showing an example of a layer structure of a can bottom member of the resealable can according to the present embodiment.
Figure 3B:
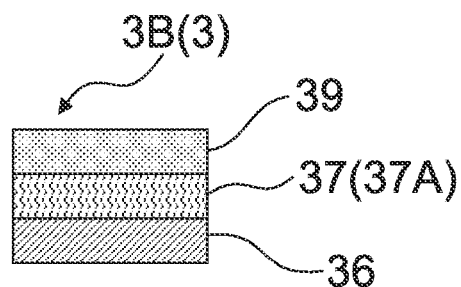
FIG. 3B is a cross-sectional view showing an example of the layer structure of the can bottom member of the resealable can according to the present embodiment.
Figure 3C:
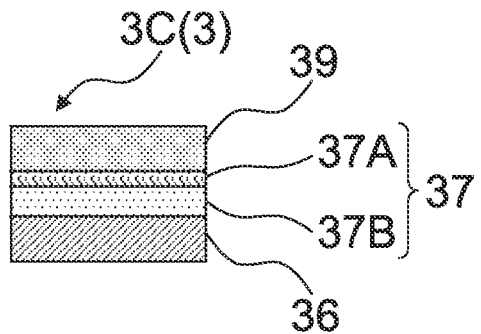
FIG. 3C is a cross-sectional view showing an example of the layer structure of the can bottom member of the resealable can according to the present embodiment.
Figure 3D:
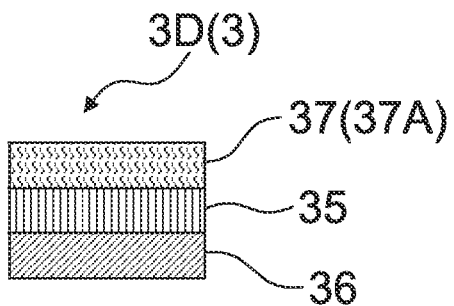
FIG. 3D is a cross-sectional view showing an example of the layer structure of the can bottom member of the resealable can according to the present embodiment.
Figure 3E:
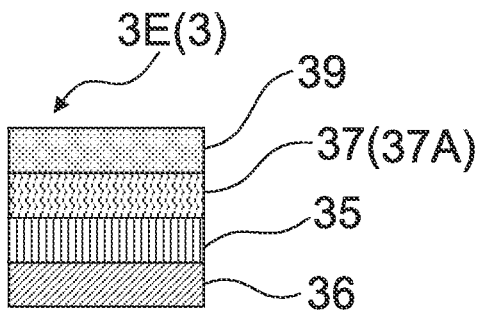
FIG. 3E is a cross-sectional view showing an example of the layer structure of the can bottom member of the resealable can according to the present embodiment.
Figure 3F:
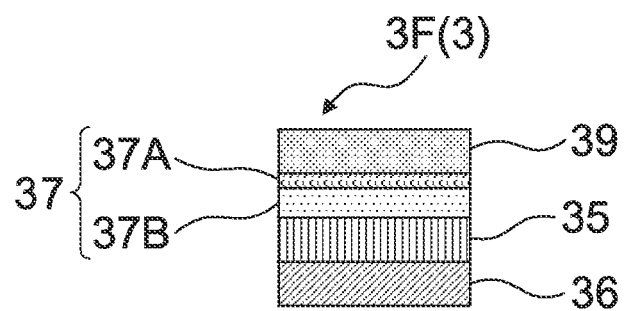
FIG. 3F is a cross-sectional view showing an example of the layer structure of the can bottom member of the resealable can according to the present embodiment.
Figure 3G:
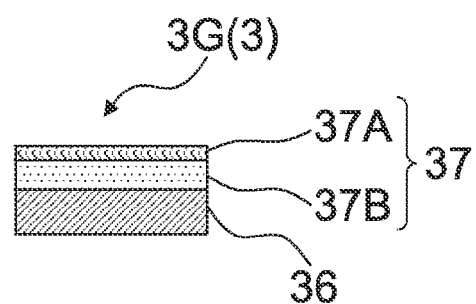
FIG. 3G is a cross-sectional view showing an example of the layer structure of the can bottom member of the resealable can according to the present embodiment.
Figure 3H:
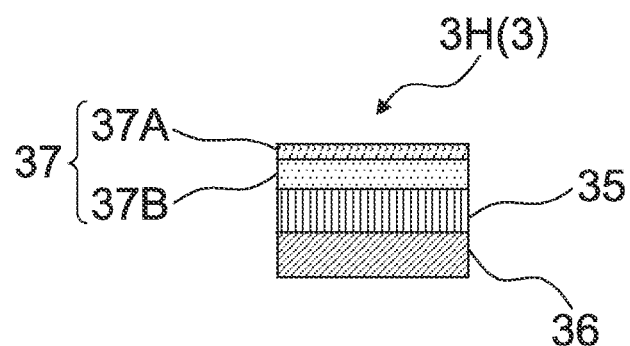
FIG. 3H is a cross-sectional view showing an example of the layer structure of the can bottom member of the resealable can according to the present embodiment.

Moreover, FIGS. 3A to 3H show an example of the above-described Sn-plated steel sheet for the can bottom member. In FIG. 3A, the can bottom member 3A includes the steel sheet 36 and the Sn plating 37 which is formed on the surface of the steel sheet 36. In FIG. 3B, the can bottom member 3B includes the steel sheet 36, the Sn plating 37 which is formed on the surface of the steel sheet 36, and a Zr-containing film 39 which is formed on the surface of the Sn plating 37. Similarly, in FIG. 3C, the can bottom member 3C includes the steel sheet 36, the Sn plating 37 which is formed on the surface of the steel sheet 36, and the Zr-containing film 39 which is formed on the surface of the Sn plating 37. In FIG. 3D, the can bottom member 3D includes the steel sheet 36, Ni plating 35 which is formed on the surface of the steel sheet 36, and the Sn plating 37 which is formed on the surface of the Ni plating 35. In FIG. 3E, the can bottom member 3E includes the steel sheet 36, the Ni plating 35 which is formed on the surface of the steel sheet 36, the Sn plating 37 which is formed on the surface of the Ni plating 35, and the Zr-containing film 39 which is formed on the surface of the Sn plating 37. Similarly, in FIG. 3F, the can bottom member 3F includes the steel sheet 36, the Ni plating 35 which is formed on the surface of the steel sheet 36, the Sn plating 37 which is formed on the surface of the Ni plating 35, and the Zr-containing film 39 which is formed on the surface of the Sn plating 37. In FIG. 3G, the can bottom member 3G includes the steel sheet 36 and the Sn plating 37 which is formed on the surface of the steel sheet 36. In FIG. 3H, the can bottom member 3H includes the steel sheet 36, the Ni plating 35 which is formed on the surface of the steel sheet 36, and the Sn plating 37 which is formed on the surface of the Ni plating 35.

Here, in FIGS. 3A, 3D, 3G, and 3H, the outermost surface on the can body member 2 side of the can bottom member 3 is the Sn plating 37, and in FIGS. 3B, 3C, 3E, and 3F, the outermost surface on the can body member 2 side of the can bottom member 3 is Zr-containing film 39. In addition, in FIGS. 3D to 3F, and 3H, the can bottom member 3 includes the Ni plating 35 which is formed on the surface on the can body member 2 side of the can bottom member 3 on or above the steel sheet 36. Moreover, in FIGS. 3A, 3B. 3D, and 3E, the Sn plating 37 includes only the Sn single metal plating 37A. In addition, in FIGS. 3C, 3F, 3G, and 3H, the Sn plating 37 includes both the Sn single metal plating 37A and alloyed Sn plating 37B.

Figure 4A:
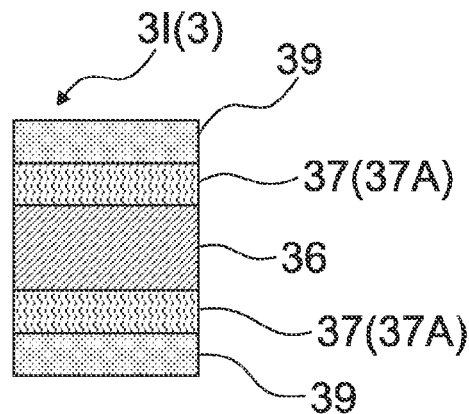
FIG. 4A is a cross-sectional view showing an example of the layer structure of the can bottom member of the resealable can according to the present embodiment.
Figure 4B:
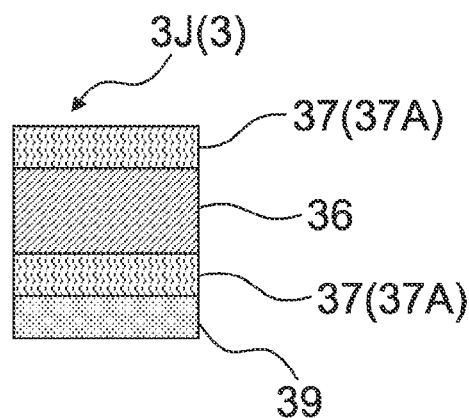
FIG. 4B is a cross-sectional view showing an example of the layer structure of the can bottom member of the resealable can according to the present embodiment.

Moreover, as described above, the Zr-containing film 39 is formed so as to improve the coatability of the outer surface of the can main body 5. However, in order to easily form the Zr-containing film 39, for example, as shown in a can bottom member 3I of FIG. 4A, the Zr-containing film 39 may be formed on both surfaces of the can bottom member 3. Moreover, in order to effectively exert the sacrificial protection effect of the Sn plating 37 as possible, for example, as shown in a can bottom member 3J of FIG. 4B, the Zr-containing film 39 may be only formed on the outer surface of the can main body 5. In addition, for example, FIGS. 4A and 4B schematically show an area C which is enclosed by a dashed line in FIG. 1A.

The Zr-containing films 29 and 39 contain Zr compounds and, for example, may contain one or more compounds which are selected from among Zr oxide, Zr phosphate, Zr hydroxide, and Zr fluoride as the Zr compounds.

In the embodiment, the can main body 5 can be manufactured by variously combining the above-described can body member 2 and the can bottom member 3.

For example, in the embodiment, as described below, by controlling an amount of each layer (each plating and film) and order of the lamination, the can main body suitable as a container for filling acidic liquid can be provided.

(A) A three-piece resealable can, which includes a can bottom portion and a can body portion which is subjected to threading, for acidic liquid is provided in which a steel sheet in which Sn plating is applied to one surface at 2 to 15 g/m$^2$ is used in the can bottom portion, and a steel sheet in which Ni plating is applied to one surface at 200 to 1000 mg/m$^2$, subsequently, a Zr-containing film is applied at 2 to 40 mg/m$^2$ expressed in terms of Zr metal, and a polyester film (PET film) is laminated is used in the can body portion.

(B) A three-piece resealable can, which includes a can bottom portion and a can body portion which is subjected to threading, for acidic liquid is provided in which a steel sheet in which Sn plating is applied to one surface at 2 to 15 g/m$^2$, and subsequently, a Zr-containing film is applied at 2 to 40 mg/m$^2$ expressed in terms of Zr metal is used in the can bottom portion, and a steel sheet in which Ni plating is applied to one surface at 200 to 1000 mg/m$^2$, a Zr-containing film is applied at 2 to 40 mg/m$^2$ expressed in terms of Zr metal, and a polyester film (PET film) is laminated is used in the can body portion.

(C) A three-piece resealable can, which includes a can bottom portion and a can body portion which is subjected to threading, for acidic liquid is provided in which a steel sheet in which Sn plating is applied to one surface at 2 to 15 g/m$^2$ is used in the can bottom portion, and a steel sheet in which Ni plating is applied to one surface at 10 to 200 mg/m$^2$, subsequently, Sn plating is applied at 0.2 to 2 g/m$^2$, Sn is alloyed by performing reflow, thereafter, a Zr-containing film is applied at 2 to 40 mg/m$^2$ expressed in terms of Zr metal, and a polyester film (PET film) is laminated is used in the can body portion.

(D) A three-piece resealable can, which includes a can bottom portion and a can body portion which is subjected to threading, for acidic liquid is provided in which a steel sheet in which Sn plating is applied to one surface at 2 to 15 g/m$^2$, subsequently, a Zr-containing film is applied at 2 to 40 mg/m$^2$ expressed in terms of Zr metal is used in the can bottom portion and a steel sheet in which Ni plating is applied to one surface at 10 to 200 mg/m$^2$, subsequently, Sn plating is applied at 0.2 to 2 g/m$^2$, Sn is alloyed by performing reflow, thereafter, a Zr-containing film is applied at 2 to 40 mg/m$^2$ expressed in terms of Zr metal, and a polyester film (PET film) is laminated is used in the can body portion.

(E) A three-piece resealable can for acidic liquid is provided in which the reflow is performed after the Sn plating and Sn of 0.2 to 1.5 g/m$^2$ is alloyed in the Sn-plated steel sheet which is used in the can bottom portion and the can body portion according to any one of (A) to (D).

(F) A three-piece resealable can for acidic liquid is provided in which the Ni plating is applied to one surface at 10 to 200 mg/m$^2$ before the Sn plating in the Sn-plated steel sheet which is used in the can bottom portion according to any one of (A) to (E).

EXAMPLES

Hereinafter, the present invention will be described in detail according to examples and comparative examples shown in Tables 1 and 2.

The plated steel sheets for the can body members are manufactured by following methods.

(Manufacturing Method 1) Ni plating was applied to both surfaces of a sheet to be plated (steel sheet) which was subjected to annealing and skin pass after cold rolling and had a thickness of 0.19 mm, by applying a current of a current density of 1 A/dm$^2$ in a solution of 45° C. and pH 4 including Ni ions of 40 g/L using Ni sulfate and boric acid. Subsequently, a Zr-containing film was formed on the Ni plating by performing cathode electrolysis at a current density of 10 A/dm$^2$ in a solution of 5 g/L Zr fluoride, 4 g/L phosphoric acid, and 5 g/L hydrofluoric acid. The amount of Zr in the Zr-containing film was regulated by regulating the time of the electrolysis. The Ni-plated steel sheet was cut down to a length of 110 mm and a width of 170 mm, a PET film which was biaxially stretched and had a thickness of 15 μm was laminated on both surfaces of the sheet except for the vicinity of the vertical edges which became the portions to be welded, and the Ni-plated steel sheet for the can body member was manufactured.

(Manufacturing Method 2) Ni plating was applied to both surfaces of a sheet to be plated (steel sheet) which was subjected to annealing and skin pass after cold rolling and had a thickness of 0.19 mm, by applying a current of a current density of 10 A/dm$^2$ in a solution of 45° C. and pH 2.5 including Ni ions of 40 g/L and Fe ions of 20 g/L using Ni sulfate, Fe sulfate, and boric acid. Subsequently, by preparing an Sn plating solution of pH 1.1 including Sn ions of 20 g/L using Sn sulfate and sulfuric acid, Sn plating was applied on the Ni plating at 45° C. and 2 A/dm$^2$. Reflow was performed to the plated steel sheet, and then, a Zr-containing film was formed on the Sn plating. In the reflow, the steel sheet was cooled by 60° C. water just after being heated up to about 245° C. through an electric heating method. Formation of the Zr-containing film (Zr treatment) was performed under the same conditions as Manufacturing Method 1. The Sn-plated steel sheet was cut down to a length of 110 mm and a width of 170 mm, a PET film which was biaxially stretched and had a thickness of 15 μm was laminated on both surfaces of the sheet except for the vicinity of the vertical edges which became the portions to be welded, and the Sn-plated steel sheet for the can body member was manufactured.

(Manufacturing Method 3) Ni plating was applied to both surfaces of a sheet to be plated (steel sheet) which was subjected to annealing and skin pass after cold rolling and had a thickness of 0.19 mm, by applying a current of a current density of 1 A/dm$^2$ in a solution of 45° C. and pH 4 including Ni ions of 40 g/L using Ni sulfate. Subsequently, by preparing an Sn plating solution of pH 1.1 including Sn ions of 20 g/L using Sn sulfate and sulfuric acid, Sn plating was applied on the Ni plating at 45° C. and 2 A/dm$^2$. Reflow was performed to the plated steel sheet, and then, a Zr-containing film was formed on the Sn plating. In the reflow, the steel sheet was cooled by 60° C. water just after being heated up to about 245° C. through an electric heating method. Formation of the Zr-containing film (Zr treatment) was performed under the same conditions as Manufacturing Method 1. The Sn-plated steel sheet was cut down to a length of 110 mm and a width of 170 mm, a PET film which was biaxially stretched and had a thickness of 15 μm was laminated on both surfaces of the sheet except for the vicinity of the vertical edges which became the portions to be welded, and the Sn-plated steel sheet for the can body member was manufactured.

(Manufacturing Method 4) Ni plating was applied to both surfaces of a sheet to be plated (steel sheet) which was subjected to annealing and skin pass after cold rolling and had a thickness of 0.19 mm, by applying a current of a current density of 1 A/dm$^2$ in a solution of 45° C. and pH 4 including Ni ions of 40 g/L using Ni sulfate and boric acid. Subsequently, by performing cathode electrolysis for 0.2 second at a current density of 3 A/dm$^2$ in a solution of 30 g/L chromic acid and 2.8 g/L sulfuric acid, a chromate film having an amount of Cr being 8 mg/m$^2$ expressed in terms of Cr metal was formed on the Ni plating. The Ni-plated steel sheet was cut down to a length of 110 mm and a width of 170 mm, a PET film which was biaxially stretched and had a thickness of 15 μm was laminated on both surfaces of the sheet except for the vicinity of the vertical edges which became the portions to be welded, and the Ni-plated steel sheet for the can body member was manufactured.

The Sn-plated steel sheet for the can bottom member was manufactured by the following methods.

(Manufacturing Method 5) Sn plating was applied to both surfaces of a sheet to be plated (steel sheet) which was subjected to annealing and skin pass after cold rolling and had a thickness of 0.19 mm, at 45° C. and 2 A/dm$^2$ in an Sn plating solution of pH 1.1 including Sn ions of 20 g/L prepared using Sn sulfate and sulfuric acid, reflow and formation of Zr-containing film were performed as necessary. In the reflow, the steel sheet was cooled by 60° C. water just after being heated up to about 245° C. through an electric heating method. Formation of the Zr-containing film (Zr treatment) was performed under the same conditions as Manufacturing Method 1.

(Manufacturing Method 6) After the Ni plating was applied to both surfaces of a sheet to be plated (steel sheet) which was subjected to annealing and skin pass after cold rolling and had a thickness of 0.19 mm using the same conditions as in the Manufacturing Method 2, Sn plating was applied on the Ni plating at 45° C. and 2 A/dm$^2$ in an Sn plating solution of pH 1.1 including Sn ions of 20 g/L prepared by using Sn sulfate and sulfuric acid. Reflow and formation of Zr-containing film were performed as necessary. In the reflow, the steel sheet was cooled by 60° C. water just after being heated up to about 245° C. through an electric heating method. Formation of the Zr-containing film (Zr treatment) was performed under the same conditions as Manufacturing Method 1.

(Manufacturing Method 7) After Ni plating was applied to both surfaces of a sheet to be plated (steel sheet) which was subjected to annealing and skin pass after cold rolling and had a thickness of 0.19 mm using the same conditions as in the Manufacturing Method 3, Sn plating was applied on the Ni plating at 45° C. and 2 A/dm$^2$ in an Sn plating solution of pH 1.1 including Sn ions of 20 g/L prepared by using Sn sulfate and sulfuric acid. Reflow and formation of Zr-containing film were performed as necessary. In the reflow, the steel sheet was cooled by 60° C. water just after being heated up to about 245° C. through an electric heating method. Formation of the Zr-containing film (Zr treatment) was performed under the same conditions as Manufacturing Method 1.

(Manufacturing Method 8) Sn plating was applied to both surfaces of a sheet to be plated (steel sheet) which was subjected to annealing and skin pass after cold rolling and had a thickness of 0.19 mm, at 45° C. and 2 A/dm$^2$ in an Sn plating solution of pH 1.1 including Sn ions of 20 g/L prepared using Sn sulfate and sulfuric acid. In the reflow, the steel sheet was cooled by 60° C. water just after being heated up to about 245° C. through an electric heating method. By performing cathode electrolysis in a solution of 40 g/L sodium bichromate, a chromate film having an amount of Cr being 4 mg/m$^2$ expressed in terms of Cr metal was formed on Sn plating.

Combined with the can body member by the above-described Manufacturing Methods 1 to 4 and the can bottom member by the above-described Manufacturing Methods 5 to 8, the three-piece resealable cans of Nos. 1 to 19 (Examples) and Nos. 20 to 26 (Comparative Examples) shown in Table 1 were manufactured. In Tables 1 and 2, the conditions which do not fulfill the conditions of the present invention are underlined.

Among the weight of the layer per 1 m$^2$ (the amount of Ni plating, the amount of Sn single metal plating, the amount of alloyed Sn plating, the amount of Zr-containing film, and the amount of chromate film), with respect to the amount of Ni plating, the amount of Zr-containing film (the amount expressed in terms of Zr metal), and the amount of chromate film (the amount expressed in terms of Cr metal), each of the amount of Ni metal, the amount of Zr metal, and the amount of Cr metal was estimated through an ICP (inductively coupled plasma) spectroscopic analysis. In addition, with respect to the amount of Sn single metal plating and the amount of alloyed Sn plating (the amount expressed in terms of Sn metal), the amount of Sn metal was estimated through a SEM-EDX (scanning electron microscope/energy dispersive X-ray spectroscopy). Moreover, the alloyed Sn plating was determined to be an area in which Fe and Ni were detected in the Sn plating, and Sn single metal plating was determined to be an area in which Fe and Ni were not detected substantially in the Sn plating.

obtains a sufficient welding strength between two dies while rotating two cylindrical dies including grooves having 1 mm of a pitch at 150 mpm and forms a thread and groove having 1 mm of a height and 1 mm of a pitch. Thereafter, retorting of 125° C. and 30 minutes was performed, and a peeling resistance of the film of the screw formed portion was estimated to be in one of four grades (A: separation (peel-off) was not present at all after threading and retorting, B: separation was not present after the forming and slight separation which was not a problem in practical use was

TABLE 1

| | CAN BODY MEMBER | | | | | CAN BOTTOM MEMBER | | | | | |
|---|---|---|---|---|---|---|---|---|---|---|---|
| No. | MANU-FAC-TURING METHOD | AMOUNT OF Ni PLATING (mg/m²) | AMOUNT OF Sn PLATING (g/m²) | AMOUNT OF AL-LOYED Sn PLATING (g/m²) | AMOUNT OF Zr-CON-TAINING FILM (mg/m²) | AMOUNT OF CHRO-MATE FILM (mg/m²) | MANU-FAC TURING METHOD | AMOUNT OF Ni PLATING (mg/m²) | AMOUNT OF Sn PLATING (g/m²) | AMOUNT OF AL-LOYED Sn PLATING (g/m²) | AMOUNT OF Zr-CON-TAINING FILM (mg/m²) | AMOUNT OF CHRO-MATE FILM (mg/m²) |
| 1 | 1 | 240 | — | — | 3 | — | 5 | — | 14 | — | — | — |
| 2 | 1 | 540 | — | — | 6 | — | 5 | — | 3 | — | 12 | — |
| 3 | 1 | 960 | — | — | 9 | — | 5 | — | 9 | 1.2 | — | — |
| 4 | 1 | 240 | — | — | 5 | — | 5 | — | 4 | 0.6 | 8 | — |
| 5 | 1 | 540 | — | — | 13 | — | 6 | 60 | 3 | — | — | — |
| 6 | 1 | 960 | — | — | 4 | — | 6 | 25 | 9 | — | 6 | — |
| 7 | 1 | 810 | — | — | 7 | — | 7 | 180 | 9 | 1.2 | — | — |
| 8 | 1 | 450 | — | — | 9 | — | 7 | 12 | 4 | 0.6 | 10 | — |
| 9 | 2 | 80 | 1 | 0.8 | 28 | — | 5 | — | 14 | 1.2 | — | — |
| 10 | 2 | 180 | 0.4 | 0.25 | 38 | — | 5 | — | 3 | 0.4 | 6 | — |
| 11 | 2 | 15 | 0.25 | 0.2 | 22 | — | 5 | — | 9 | 1.2 | — | — |
| 12 | 2 | 80 | 1 | 0.8 | 25 | — | 5 | — | 4 | 0.6 | 35 | — |
| 13 | 3 | 180 | 0.4 | 0.25 | 36 | — | 6 | 60 | 3 | 0.4 | — | — |
| 14 | 3 | 45 | 0.8 | 0.2 | 21 | — | 6 | 25 | 9 | 1.1 | 3 | — |
| 15 | 3 | 94 | 1.5 | 0.8 | 29 | — | 7 | 180 | 9 | 1.2 | — | — |
| 16 | 3 | 30 | 1.8 | 1.4 | 20 | — | 7 | 12 | 4 | 0.6 | 15 | — |
| 17 | 1 | 350 | — | — | 5 | — | 5 | — | 13 | 1.2 | 23 | — |
| 18 | 1 | 400 | — | — | 6 | — | 6 | 110 | 4 | 0.7 | 6 | — |
| 19 | 1 | 700 | — | — | 8 | — | 7 | 40 | 2 | 0.3 | 18 | — |
| 20 | 2 | 180 | 1 | 0.3 | 42 | — | 5 | — | 7 | 0.3 | 25 | — |
| 21 | 2 | 750 | 1 | 0.3 | 1.7 | — | 5 | — | 3 | 0.3 | 6 | — |
| 22 | 2 | 35 | 0.15 | 0.12 | 43 | — | 5 | — | 3 | 0.5 | 19 | — |
| 23 | 2 | 15 | 4 | 1.8 | 8 | — | 6 | 15 | 1.8 | 0.2 | 9 | — |
| 24 | 3 | 8 | 2.5 | 0.3 | 6 | — | 7 | 58 | 1.4 | 0.9 | 13 | — |
| 25 | 1 | 400 | — | — | 3 | — | 1 | 400 | — | — | 3 | — |
| 26 | 4 | 400 | — | — | — | 8 | 8 | — | 8 | 0.8 | — | 4 |

Hereinafter, estimation methods will be described.

[Estimation Methods]

[Weldability]

Various steel sheets for the can body members (Ni-plated steel sheets and Sn-plated steel sheets) which were manufactured were welded at a welding speed of 550 cpm by using a welder of Soudronic AG. In addition, in the welding, the overlapped portion of the portions to be welded was set to 0.4 mm, and the pressing force was set to 45 daN. The weldability was generally determined from a size of an adequate current range and continuity of a weld nugget and was estimated to be in one of four grades (A: very good, B: good, C: bad, D: welding impossible). Here, the adequate current range is a current range which includes a minimum current value in which sufficient welding strength is obtained and a maximum current value in which welding defects such as expulsion and a weld spatter begin to be significant when the welding current is changed and the welding is performed.

Film Adhesiveness of Screw Formed Portion

Threading was performed on the can body member, which pinches the upper portion of the can body member which present after the retorting, C: minor peeling was present after the forming, and D: separation was present over most thereof after the forming).

Adhesiveness of Coating Material of Can Bottom Member

Epoxy phenol resin was coated on the Sn-plated steel sheet for the can bottom member, baking at 200° C. for 30 minutes was performed, thereafter, cover forming was performed so as to be used for the can bottom member. A tape peeling test was performed to a curled portion or a countersink portion formed by the cover forming, and the peeling resistance was estimated.

In addition, grid-like marking-off having depths reaching the matrix (steel sheet) was applied to the Sn-plate steel sheet at intervals of 1 mm after the epoxy phenol resin was baked, the tape peeling test was performed on the marking-off portions, and the peeling resistance was estimated.

The results of the tape peeling test were generally estimated, the adhesiveness of the coating material was estimated to be in one of four grades (A: peeling was not present at all, B: slight peeling which was not a problem in practical use was present, C: slight peeling was present, D: peeling was present over most thereof).

[Corrosion Resistance]

The can body member (screw portion) subjected to the threading was covered with a cap made of aluminum, commercially available 100% orange juice and tomato juice were filled, the can bottom member that the cover forming is performed was seamed to the can body member, and the can was manufactured. After the can was stored at 30° C. for six months, the contents were extracted, the amount of dissolved iron was measured, and corrosion of the inner surface of the can was observed. The observation of the corrosion was performed by visually observing mainly the screw portion, and the corrosion resistance was estimated to be in one of four grades (A: corrosion was not observed at all in screw portion and flat sheet portion, B: corrosion was not observed at all in flat sheet portion while slight corrosion which was not a problem in practical use was observed in screw portion, C: slight corrosion was observed in screw portion and flat sheet portion, and D: severe corrosion was observed in the screw portion, and corrosion was also observed in flat sheet portion). The appearance of the alloyed layer exposed on the can bottom member was also observed.

[Conductivity]

To ascertain the electrical contact between the can bottom member and the can body member, the can bottom member that the cover forming was performed was seamed to the can body member which was subjected to the threading. Thereafter, the metal surface was exposed by peeling a part of the film of the outer coating of the can bottom member and the film of the head portion (the portion which ought to be sealed by the cap) of the can body member, the conductivity between the both metal-exposed surfaces was estimated by a commercially available tester. The conductivity was estimated to be in one of three grades (A: electrification is maintained stably, B: electrification which is not stable is observed, C: electrification is not observed (insulated))

The estimation results of Nos. 1 to 26 are shown in Table 2.

TABLE 2

ESTIMATION RESULTS

| | | FILM ADHESIVENESS | ADHESIVENESS OF | | ORANGE JUICE | | | TOMATO JUICE | | |
|---|---|---|---|---|---|---|---|---|---|---|
| No. | WELD-ABILITY | ADHESIVENESS IN SCREW FORMED PORTION | COATING MATERIAL ON CAN BOTTOM MEMBER | CONDUC-TIVITY | AMOUNT OF DISSOLVED IRON (ppm) | CORROSION RESISTANCE | APPEARANCE OF CAN BOTTOM MEMBER AFTER TEST | AMOUNT OF DISSOLVED IRON (ppm) | CORROSION RESISTANCE | APPEARANCE OF CAN BOTTOM MEMBER AFTER TEST |
| 1 | A | A | C | A | 4.9 | B | BLACK | 7.2 | B | BLACK |
| 2 | A | A | A | A | 6.4 | B | BLACK | 8.3 | B | BLACK |
| 3 | A | A | C | A | 2.1 | A | DARK GRAY | 2.7 | A | DARK GRAY |
| 4 | A | A | A | A | 1.8 | A | DARK GRAY | 4.1 | A | DARK GRAY |
| 5 | A | A | C | A | 3.8 | A | BLACK | 5.6 | A | BLACK |
| 6 | A | A | A | A | 3.4 | A | BLACK | 7.2 | A | BLACK |
| 7 | A | A | C | A | 0.9 | A | SILVER WHITE | 3.2 | A | SILVER WHITE |
| 8 | A | A | A | A | 1.2 | A | SILVER WHITE | 2.8 | A | SILVER WHITE |
| 9 | A | A | C | A | 6.1 | B | BLACK | 7.4 | B | BLACK |
| 10 | A | A | A | A | 5.3 | B | BLACK | 8.4 | B | BLACK |
| 11 | A | A | C | A | 1.4 | A | DARK GRAY | 3.9 | A | DARK GRAY |
| 12 | A | A | A | A | 1.9 | A | DARK GRAY | 4.3 | A | DARK GRAY |
| 13 | A | A | C | A | 3.5 | A | BLACK | 6.1 | B | BLACK |
| 14 | A | A | A | A | 4.8 | A | BLACK | 6.2 | B | BLACK |
| 15 | A | A | C | A | 0.9 | A | SILVER WHITE | 3.1 | A | SILVER WHITE |
| 16 | A | A | A | A | 1.1 | A | SILVER WHITE | 1.4 | A | SILVER WHITE |
| 17 | A | A | A | A | 1 | A | SILVER WHITE | 1.2 | A | SILVER WHITE |
| 18 | A | A | A | A | 0.9 | A | SILVER WHITE | 1.8 | A | SILVER WHITE |
| 19 | A | A | A | A | 0.8 | A | SILVER WHITE | 1.7 | A | SILVER WHITE |
| 20 | D | A | A | A | 0.5 | A | BLACK | 1.8 | A | BLACK |
| 21 | A | C | A | A | 1.1 | A | BLACK | 2.1 | A | BLACK |
| 22 | D | A | A | A | 1.2 | A | BLACK | 3.2 | A | BLACK |
| 23 | A | D | A | A | 38.4 | D | SILVER WHITE | 54.2 | D | SILVER WHITE |
| 24 | A | D | A | A | 48.5 | D | SILVER WHITE | 75.3 | D | SILVER WHITE |
| 25 | A | A | — | A | 78.4 | D | BLACK | 97.3 | D | BLACK |
| 26 | A | A | — | C | 5.8 | A | BLACK | 39.4 | C | SILVER WHITE, PARTLY DETINNED |

[Estimation Results]

As shown in Tables 1 and 2, in Nos. 1 to 19, the weldability, the film adhesiveness, the conductivity, and the corrosion resistance were sufficient. On the other hand, in Nos. 20 to 26, at least one of the weldability, the film adhesiveness, the conductivity, and the corrosion resistance was deteriorated. Moreover, in No. 25 of Tables 1 and 2, the Ni-plated steel sheet on which the same PET film as the can body member was laminated was also used with respect to the can bottom member. In No. 25, the formed portion such as the screw portion or the flat sheet portion was corroded in the form of spots, and the amount of dissolved iron also increased. In addition, in cross-sectional observation of the corroded areas, perforation corrosion proceeded. Particularly, in severely corroded areas, it was confirmed that the perforation corrosion proceeded up to about $4/5$ of the sheet thickness. On the other hand, when the Sn-plated steel sheet on which the Sn plating of sufficient amount was applied was used in the can bottom, the corrosion was not observed at all. Even in the areas where the corrosion was observed, the amount of the perforation corrosion was slight and was about $1/10$ of the sheet thickness at most.

No. 26 is an example which uses the technology of the chromate film. In this case, the effect to orange juice was recognized. However, the corrosion resistance to tomato juice which has higher corrosiveness was insufficient. Thus, by using the technology of the chromate film, the effect to various corrosive environment was insufficient due to partial ununiformity of Sn dissolution.

The adhesiveness of the coating material of Nos. 2, 4, 6, 8, 10, 12, 14, and 16 to 19 in which the Zr-containing film was applied to the can bottom member was higher compared to the adhesiveness of the coating material of Nos. 1, 3, 5, 7, 9, 11, 13, and 15 in which the Zr-containing film was not applied to the can bottom member. Accordingly, when the coating material was coated on the can bottom, it was confirmed that the can bottom member having the Zr-containing film on the surface in which the coating material was coated on the can bottom member could be appropriately used.

As described above, the preferred embodiments of the present invention are described. However, the present invention is not limited to the embodiments. It is obvious that various modifications or alterations can be conceived within the scope described in claims by a person skilled in the art, and the modifications and the alternations are also included in the technical scope of the present invention.

INDUSTRIAL APPLICABILITY

According to the present invention, by suppressing local corrosion and improving the effect of the sacrificial protection, the three-piece resealable can which has improved corrosion resistance for acidic storage substances and which can store various acidic storage substances at high quality can be provided.

REFERENCE SYMBOL LIST

1: three-piece resealable can (can; resealable can)
2 (2A and 2B): can body member (can body; can body portion)
3 (3A to 3J): can bottom member (can bottom portion; bottom cover)
4: cap
5: can main body
21: screw portion (screw formed portion)
22: welding portion
23: polyester film (organic film, PET film)
25: Ni plating
26: steel sheet (sheet to be plated)
27: Sn plating
27A: Sn single metal plating (non-alloyed Sn plating)
27B: alloyed Sn plating
29: Zr-containing film (Zr-treated film)
35: Ni plating
36: steel sheet (sheet to be plated)
37: Sn plating
37A: Sn single metal plating (non-alloyed Sn plating)
37B: alloyed Sn plating
39: Zr-containing film (Zr-treated film)

What is claimed is:

1. A three-piece resealable can for acidic liquid, the can comprising:
a cylindrical can body member that includes a screw portion at one end; and
a can bottom member that contacts with the can body member so as to close an opening portion of the other end of the can body member,
wherein the can body member includes a cylindrical first steel sheet, a Ni plating that is formed on an inner circumferential surface of the first steel sheet, a polyester film that is formed so as to be disposed on an outermost surface of an inner circumference of the can body member, and a Zr-containing film that is formed between the first steel sheet and the polyester film, wherein an amount of the Ni plating is 10 to 1000 $mg/m^2$, the Zr-containing film contains Zr compounds, and an amount of the Zr-containing film is 2 to 40 $mg/m^2$ expressed in terms of Zr metal,
wherein the can bottom member includes a second steel sheet, and an Sn plating that is formed on a surface corresponding to an inner surface of the can bottom member, the Sn plating being on or above the second steel sheet, and a Zr-containing film which is formed on a surface of the Sn plating, and wherein the Sn plating includes an Sn single metal plating in an amount of 2 to 15 $g/m^2$, an outermost surface of the surface corresponding to the inner surface of the can bottom member is the Zr-containing film, and
wherein the can body member and the can bottom member contact each other electrically.

2. The three-piece resealable can for acidic liquid according to claim 1,
wherein the Zr-containing film of the can bottom member contains Zr compounds, an amount of the Zr-containing film of the can bottom member being 2 to 40 $mg/m^2$ expressed in terms of Zr metal.

3. The three-piece resealable can for acidic liquid according to claim 1,
wherein the Sn plating of the can bottom member includes an alloyed Sn plating in an amount of 0.2 to 1.5 $g/m^2$.

4. The three-piece resealable can for acidic liquid according to claim 1,
wherein the can bottom member further includes a Ni plating in an amount of 10 to 200 $mg/m^2$ which is formed on a surface on the can body member side of the second steel sheet.

5. The three-piece resealable can for acidic liquid according to claim 2,
wherein the Zr-containing film of the can bottom member contains one or more compounds as the Zr compounds which are selected from among Zr oxide, Zr phosphate, Zr hydroxide, and Zr fluoride.

6. The three-piece resealable can for acidic liquid according to claim 1,
wherein the amount of the Ni plating of the can body member is 200 to 1000 $mg/m^2$.

7. The three-piece resealable can for acidic liquid according to claim 1,
wherein the can body member further includes an Sn plating which is formed on a surface of the Ni plating, the Sn plating including an Sn single metal plating in 0.2 to 2 $g/m^2$ and an alloyed Sn plating, and the amount of the Ni plating being 10 to 200 $mg/m^2$.

8. The three-piece resealable can for acidic liquid according to claim 7,
wherein the Sn plating of the can body member includes the alloyed Sn plating in an amount of 0.2 to 1.5 $g/m^2$.

9. The three-piece resealable can for acidic liquid according to any one of claims 1 and 2 to 8,
wherein the Zr-containing film of the can body member contains one or more compounds as the Zr compound which are selected from among Zr oxide, Zr phosphate, Zr hydroxide, and Zr fluoride.

* * * * *